United States Patent

[11] 3,611,379

| [72] | Inventor | Martin Deckett<br>Bad Godesberg, Germany |
|---|---|---|
| [21] | Appl. No. | 861,936 |
| [22] | Filed | Sept. 29, 1969 |
| [45] | Patented | Oct. 5, 1971 |
| [73] | Assignee | TRW Inc.<br>Redondo Beach, Calif. |

[54] TRACKING SYSTEM
7 Claims, 6 Drawing Figs.

[52] U.S. Cl. .................................................. 343/15,
343/6.5
[51] Int. Cl. ...................................................... G01s 9/04
[50] Field of Search ............................................ 343/6.5, 6.5
LC, 15

[56] References Cited
UNITED STATES PATENTS
2,470,787  5/1949  Nosker ........................  343/15 X
2,746,034  5/1956  Hasbrook .....................  343/15
3,384,891  5/1968  Anderson .....................  343/6.5 LC

*Primary Examiner*—Malcolm F. Hubler
*Attorneys*—Daniel T. Anderson, Harry I. Jacobs and Gerald Singer ABSTRACT: An apparatus for locating a large number of cooperative targets consisting of a ground-based master station, three airborne repeaters and as many transponder units as there are cooperative targets. The master station transmits pulses, which are received by the repeaters. The repeaters in turn transmit the pulses at a second frequency. The transponders and the repeaters transmit back to the master station. By accurately measuring the time required for the pulses from the transponders and repeaters to return, the location of each cooperative target can be determined.

INVENTOR.
Martin Deckett
ATTORNEY

TRACKING SYSTEM

BACKGROUND OF THE INVENTION

It is desirable to generate, at one central location, the accurate position data of a large number of cooperative targets. In the military field, a theater commander has to know where all his fighting units are in the battle area. In the civilian field, transportation organizations need to know where their vehicles are located.

Obviously a plurality of tracking radars could be employed, one for each target and each radar continuously tracking and providing azimuth, elevation and range data for its particular target. Such an arrangement is uneconomical when more than a few targets are tracked. The picture is further complicated because each radar must track only its assigned target despite the presence of similar targets in the same area.

In U.S. Pat. No. 2,857,592 by Phillip A. Hoffman, an apparatus for tracking each of a plurality of objects is disclosed. Each tracked object includes a radar reply beacon which sends out a reply pulse in response to a coded radar interrogating signal corresponding to that particular object. Three widely spaced synchronized ground stations, having known positions, sequentially interrogate the objects to determine their slant range. Once the slant range of each object from the known position of the ground station is determined, accurate location of each object can be accomplished.

The system disclosed by Hoffman requires accurate synchronization between the ground stations and the tracked targets. Such synchronization is expensive and adds additional weight where weight is at a premium. Hoffman further requires that an identifying code be transmitted and decoded by the equipment on the tracked target.

SUMMARY

In accordance with one aspect of the present invention, a ground-based master station is used in conjunction with three airborne repeaters and as many transponder units as there are cooperative targets. The master station transmits pulses at a first frequency to the three airborne repeaters. One repeater transponds the pulse back to the master station. Simultaneously, the repeater transmits the pulse to the other ground repeaters and the target transponders at a second frequency. Either ground repeater or any transponder transponds the pulse at the second frequency back to the airborne repeater. The airborne repeater transmits the pulse at the first frequency to the master station. The master station thus receives two pulses at the first frequency. The time difference between transmission and the first reception is the two-way transit time between the master and the airborne relay. The time difference between the first and second receptions is the two-way transit time between the airborne relay and either the ground repeater or the transponder unit. Through a method of synchronized sequencing of all the units in the system, and accurate measurement of all the time differences, the location of each cooperative target can be determined.

DESCRIPTION OF THE PREFERRED EMBODIMENTS

Figure 1:
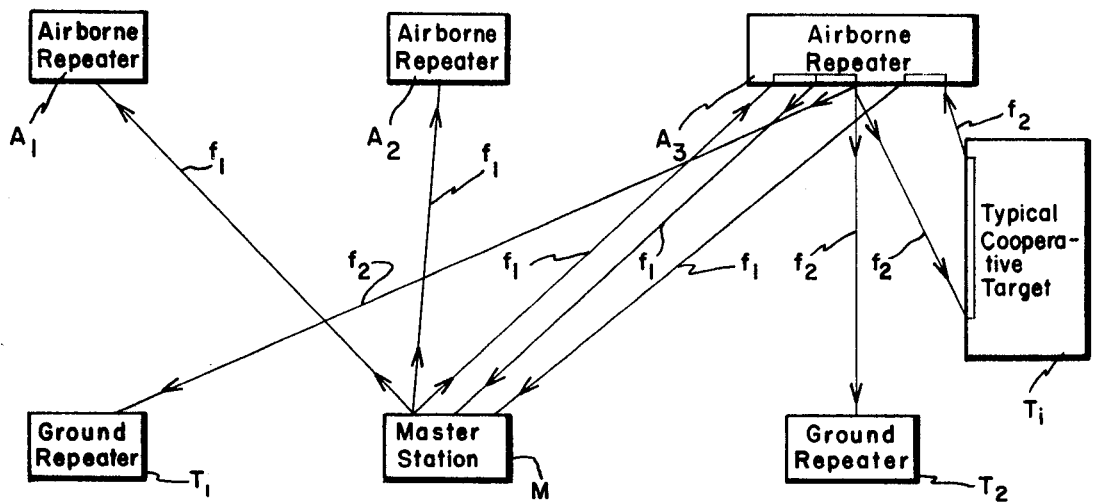
FIG. 1 is a block diagram of an example of a tracking system constructed in accordance with the principle of the present invention.

In FIG. 1, the example of the system shown includes a ground-based master station M, three airborne repeaters $A_1$, $A_2$, and $A_3$, two ground repeaters $T_1$, and $T_2$, and as many transponder units as there are cooperative targets $T_3$, $T_4$, ... $T_n$.

In this example, master station M transmits pulses at frequency $f_1$ to the three airborne repeaters. One of these repeaters transponds the pulse back to the master at $f_1$ and also transmits it to ground repeaters $T_1$ and $T_2$ and to the target transponder units $T_i$ at frequency $f_2$. Either one of the ground repeaters or one of the transponder units is able to transpond the pulse at $f_2$. At the airborne repeater, the pulse received at $f_2$ is transmitted at $f_1$ for reception by the master station M. Thus, after master station M transmits a pulse at $f_1$, it receives back two other pulses at $f_1$. The time difference between transmission and first reception is the two-way transit time between the master station and the airborne repeater. The time difference between the first and second receptions is the two-way transit time between the airborne repeater and either the ground repeater or the transponder unit. These time differences are very accurately measured at the master station.

Through a novel method of synchronized sequencing in all units of the total system, the master station knows, a priori, which airborne repeater and which ground repeater or transponder units will have enabled transmitters during any specified pulse period. Thus, it is able to identify the two time measurements with specific interunit slant ranges.

The ground repeaters may be essentially identical with the target transponder units. Functionally they are located on the ground at accurately surveyed locations.

In each cycle of the system, the first six pulses are used to find the distances $MA_1$, $MA_2$, $MA_3$,
$T_1A_1$, $T_1A_2$, $T_1A_3$
$T_2A_1$, $T_2A_2$, $T_2A_3$ Since the locations of M, $T_1$ and $T_2$ are known, the locations of all three airborne repeaters can be found.

Therefore, every set of three consecutive pulses is used to find, for example $T_iA_1$, $T_iA_2$, $T_iA_3$ Since the locations of $A_1$, $A_2$ and $A_3$ are now known, the location of $T_i$ is determinable.

The master station generates a pulse train, with a pulse width of $\tau$ and a pulse repetition index of $p$, and transmits the train on a carrier of frequency $f_1$.

Figure 2:
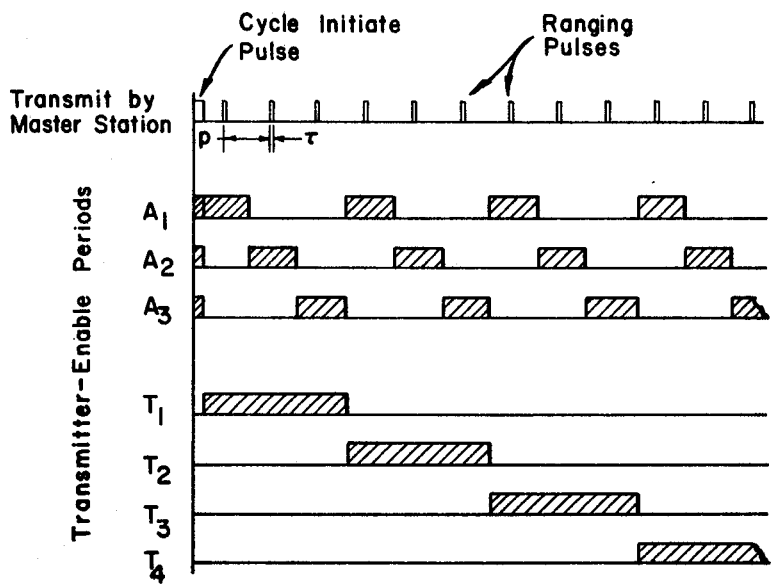
FIG. 2 is a sequencing diagram relating to the operation thereof.

Each of the airborne repeaters, $A_1$, $A_2$, and $A_3$, has a receiver tuned to frequency $f_1$ and receives the pulse train. However, as shown in FIG. 2, only one of the three has its transmitters enabled. The enabled airborne repeater transponds the pulse from the master station at two different frequencies. One is the same frequency as was received, $f_1$, and the other is $f_2$.

The transponded pulse at frequency $f_1$ is received by master station M. The time interval between the transmission of the pulse by master station M and the reception of the transponded pulse is accurately measured at the master station. This time difference is used to compute the master-airborne repeater slant range.

The transponded pulse, generated at the airborne repeater at frequency $f_2$ is received by the other two airborne repeaters and by all the transponder units. However, since only one airborne repeater has an enabled transmitter at any time, the reception of the pulse by the other airborne repeaters is of no consequence.

Also, the transponder units are synchronized so that only one of them has an enabled transmitter at any time. The enabled unit transponds, without frequency change, the pulse at frequency $f_2$ which it received from the airborne repeater. The transponded pulse is received back at the airborne repeater where it is retransponded at frequency $f_1$. This last pulse is received at the master station.

The time interval between receipt of the two transponded pulses at the master station is accurately measured there. This is used to compute the transponder unit-airborne relay slant range.

To recapitulate, there is, in the example described, associated with each ranging pulse sent by the master station one specific airborne repeater and one specific transponder unit. These two are the only ones of their type which have enabled transmitters at this time.

The ranging pulse is transmitted by master station M at frequency $f_1$ and received by the airborne repeater. This causes the airborne repeater to transmit pulses simultaneously at frequencies $f_1$ and $f_2$. The pulse at $f_1$ is received by master station M. The pulse at $f_2$ is received by the transponder unit and retransmitted at the same frequency. This retransmitted pulse is received by the airborne repeater and causes the latter to transmit a pulse at frequency $f_1$ which is also received by master station M.

SEQUENCING

The airborne repeater remains in the transmitter-enabled mode for a pulse repetition interval of $p$. Then the next airborne repeater is enabled and then the third, returning again to the first.

Each transponder unit remains in the transmitter-enabled mode for $3p$. Then the next transponder unit is enabled.

As sown in FIG. 2, in each complete measurement cycle there are $3n$ ranging pulses transmitted. The first airborne relay $A_1$ is enabled during the 1st, 4th, 7th, etc., pulse periods; $A_2$ is enabled during the 2nd, 5th, 8th, etc., pulse periods; and $A_3$ is enabled during the 3rd, 6th, 9th, etc., pulse periods.

The first ground repeater $T_1$ is enabled during the 1st, 2nd and 3rd pulse periods; $T_2$ is enabled during the 4th, 5th, and 6th pulse periods. Thereafter, each of the transponder units is enabled for three consecutive pulse periods; that is, transponder unit $T_i$ is enabled during the $(3i-2)$, $(3i-1)$ and $(3i)$ pulse periods.

Each ranging pulse provides measures of the slant range between master station M and an airborne relay and of the slant range between that airborne relay and either a ground relay or a transponder unit.

When all components of the total system are synchronized, the identities of the airborne relay and the ground relay or transponder unit for each pulse period are determinable.

COMPUTATIONS

The positions of the two ground repeaters, $T_1$ and $T_2$, and of master station M are known. Thus, assuming that the airborne repeaters do not move a significant distance in time $3p$, the positions of these repeaters can be found after the sixth pulse period, as follows:

Position of $A_1$ is found from measurements of $MA_1$ and $T_1A_1$ (obtained during first pulse period) and $T_2A_1$ (obtained during fourth pulse period). Positions of $A_2$ and $A_3$ are found in a similar manner.

These computations, although quadratic, are simple and unambiguous. It can be readily proved that if three spheres mutually intersect each other (i.e., all pass through a common point), then they must do so twice. That is, position determination by the measurement of three slant ranges is not a genuinely unambiguous process.

However, if the centers of the three spheres are approximately coplanar, then the two points of intersection are approximately equidistant from the plane, lying one to each side of it.

In the system described here, the master station M and both ground repeaters $T_1$ and $T_2$ will, in practice, all lie close to a common horizontal plane. Hence, of the two apparent positions for each airborne repeater, one will be as far below the earth's surface as the other is above it. The ambiguity is thus easily resolved by a computer.

Similarly, in practice the three airborne repeaters fly at approximately the same altitude. Hence, the position of each cooperative target is given as either at some point below this altitude plane or at some point equally above it. Practically, all targets are known to be, a priori, below the airborne repeaters.

Hence, the actual ambiguity is very simply resolved without the need of other information. It is for this reason that the system is called "unambiguous."

The positions of the transponder units are then found, as follows:

Position of $T_3$ is found from measure of $T_3A_1$, $T_3A_2$ and $T_3A_3$, obtained during the 7th, 8th, and 9th pulse periods, respectively, and from the previously computed positions of $A_1$, $A_2$, and $A_3$.

Positions of $T_4$, $T_5$, etc., are found in a similar manner.

The positions of $A_1$, $A_2$ and $A_3$ are updated by measurement once every cycle, The duration of a cycle is likely to be sufficiently large, so that airborne repeater movement during a cycle becomes significant. In this case, the positions are updated by linear extrapolation before being used in a computation for the position of a transponder unit.

Each ranging pulse gives rise to two measures of time difference. Both of these are used only at the first three pulse periods in a cycle. Thereafter, only the second is used.

SYNCHRONIZATION

The units in the total system have to be synchronized so that the transmitters are sequentially enabled in a proper manner, That is, the purpose of synchronization is to aid in identification and is not to make range measurements. Hence, considerable accuracy in synchronization is not required.

Figure 5:
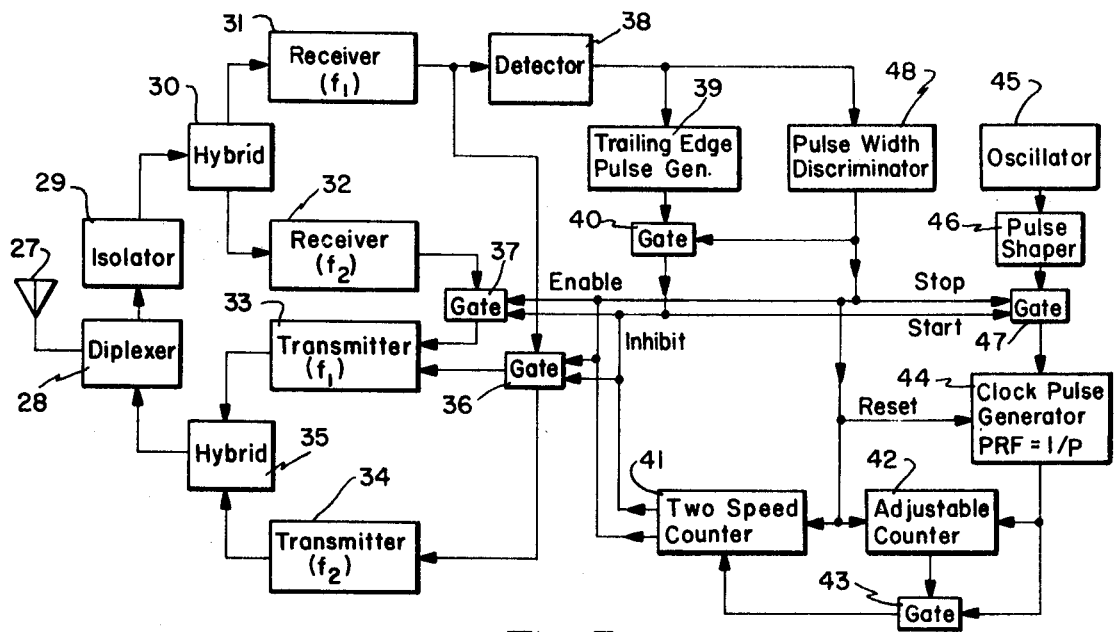
FIG. 5 is a more detailed block diagram of an example of an airborne repeater indicated in FIG. 1.
Figure 6:
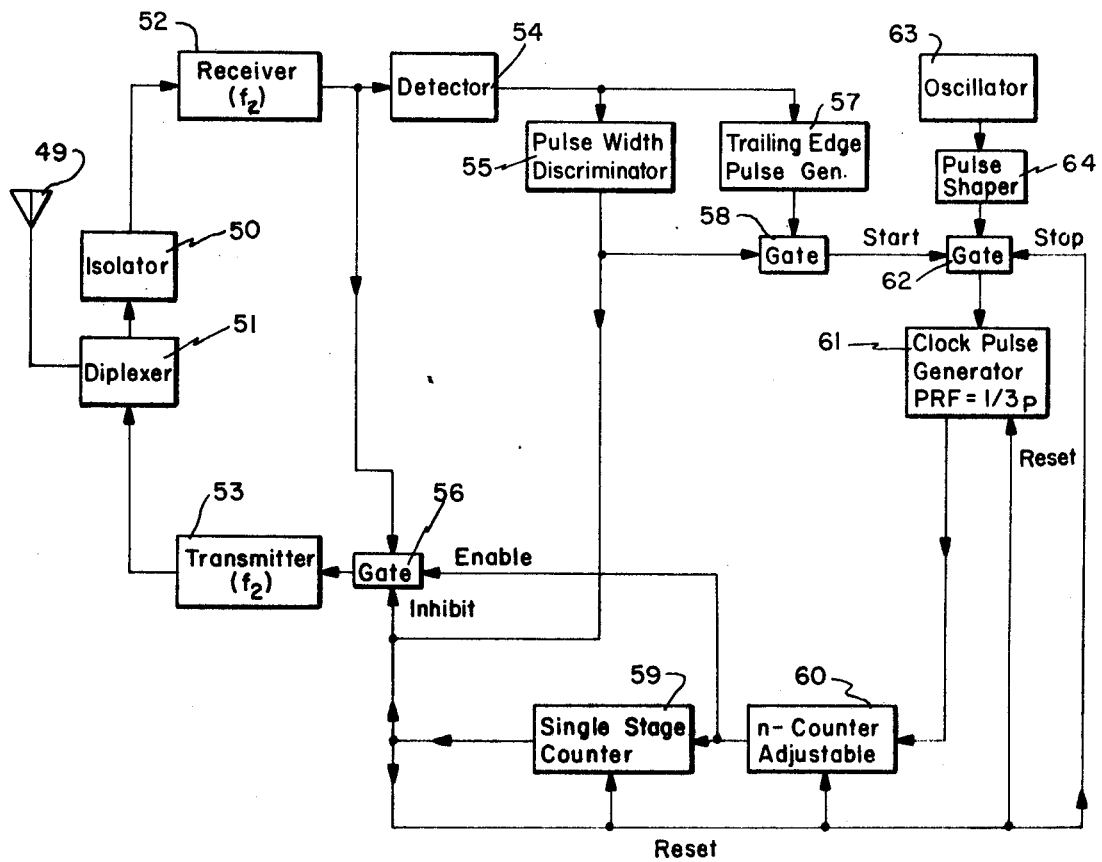
FIG. 6 is a more detailed block diagram of a typical transponder unit according to the invention.

The airborne and ground repeaters and the transponder units each have free-running oscillators 45 and 63 respectively to generate clock pulses as shown in FIGS. 5 and 6. Since guard bands are allowed at the start and end of enable periods and since frequency errors can accumulate only during a cycle, these oscillators do not have to be more stable than about $1:10^4$.

To prevent the accumulation of timing errors, oscillators 10, 45 and 63 are synchronized once every cycle.

At the beginning of each cycle, master station M transmits a very long pulse of duration $10\tau$. This is called the cycle initiating pulse, CIP as shown in FIG. 2. All receivers in the other system units check the pulse width of all pulses they receive. When the airborne repeaters detect that they are receiving a pulse from the master station having duration greater than $3\tau$, they enable their transmitters, if they are not already enabled, and thus transmit the pulse to the ground repeaters and to the transponder units. Also, the enabling/inhibiting sequence is broken at the airborne repeaters, leaving the transponders in the enabled mode, and the counters are reset to zero.

Similarly, when the ground repeaters and transponder units detect that they are receiving a pulse from the airborne repeaters having duration greater than $3\tau$, they prepare to be synchronized.

When the cycle-initiating pulse ends, clocks 11, 44 and 61 are set running in the master station, airborne receiver and transponder units respectively.

The sequencing will fail if an undesired pulse is transmitted or if a desired pulse is not transmitted by any unit in the system. The time intervals between the inhibiting of a transmitter and the arrivals of the previous-desired pulse and the next-undesired pulse are here termed margins. Similarly, the time intervals between the enabling of a transmitter and the arrivals of the previous-undesired pulse and the next-desired pulse are margins. The following analysis shows the conditions which maximize the minimum margin.

Since frequency errors in the oscillators carried by the airborne repeaters and transponder units have their greatest deleterious effect on margins at the end of a cycle, the analysis considers only the situation at the end of a cycle. This is described with reference to FIG. 3 where the last four pulse periods are shown. $T_n$ is the last transponder unit to be enabled in every cycle.

Figure 3:
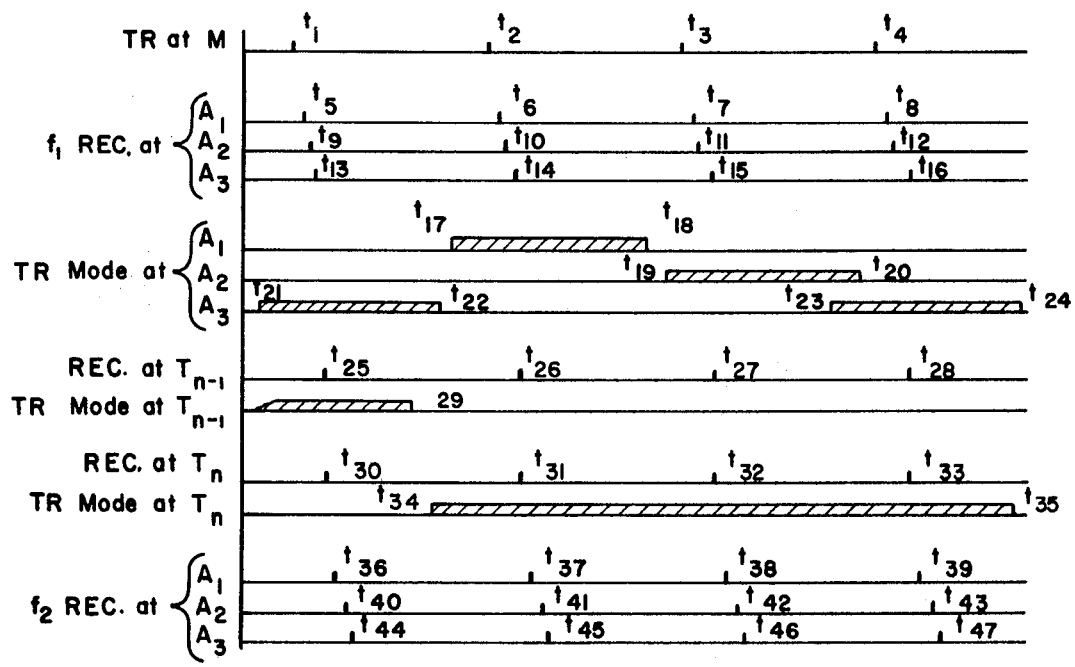
FIG. 3 is a graph showing the event times for margin analysis of signals indicated in FIG. 2.

From the point of view of sequencing analysis, the receiver delays and the pulse widths are insignificant, and pulses are considered to occur at discrete moments of time. Each event shown in FIG. 3 is labeled with an occurrence time, with a time zero epoch at the moment the cycle initiate pulse was transmitted from master station M.

We assume that the nominal phasing is as follows:

Master Station - First ranging pulse transmitted $k$ after the cycle initiate pulse is transmitted. Subsequent ranging pulses transmitted at intervals of $p$.

Airborne Repeater $A_1$ - First enable period starts $h$ after the cycle initiate pulse is received. Enable period is $p$ and inhibit period is $2p$.

Airborne Repeater, $A_2$ - First enable period starts $(h+p)$ after the cycle initiate pulse is received. Enable period is $p$ and inhibit period is $2p$.

Airborne Repeater, $A_3$ - First enable period starts $(h+2p)$ after $$t_1 = k + 3np - 4p$$
$$t_2 = k + 3np - 3p$$
$$t_3 = k + 3np - 2p$$
$$t_4 = k + 3np - p$$
$$t_5 - t_1 = t_6 - t_2 = t_7 - t_3 = t_8 - t_4 = m_1$$
$$t_9 - t_1 = t_{10} - t_2 = t_{11} - t_3 = t_{12} - t_4 = m_2$$
$$t_{13} - t_1 = t_{14} - t_2 = t_{15} - t_3 = t_{16} - t_4 = m_3$$
$$t_{17} = m_1 + (h + 3snp - 3p)(1 + \epsilon_1)$$
$$t_{19} = m_2 + (h + 3np - 2p)(1 + \epsilon_2)$$
$$t_{21} = m_3 + (h + 3np - 4p)(1 + \epsilon_3)$$
$$t_{18} - t_{17} = (1 + \epsilon_1)p$$
$$t_{20} - t_{19} = (1 + \epsilon_2)p$$
$$t_{22} - t_{21} = t_{24} - t_{23} = (1 + \epsilon_3)p$$
$$t_{23} - t_{22} = 2(1 + \epsilon_3)p$$
$$t_{25} - t_{13} = a_3$$
$$t_{26} - t_6 = a_1$$
$$t_{27} - t_{11} = a_2$$
$$t_{28} - t_{16} = a_3$$

the cycle initiate pulse is received. Enable period is $p$ and inhibit period is $2p$.

Transponder Unit, $T_{I}$- Enable period starts $(u+3ip-3p)$ after the cycle initiate pulse is received. Enable period is $3p$.

The other assumptions made are: 1. One way transit times are:

$$MA_1 = m_1$$
$$MA_2 = m_2$$
$$MA_3 = m_3$$
$$T_{nII}A_1 = a_1$$
$$T_{nII}A_2 = a_2$$
$$T_{nII}A_3 = a_3$$
$$T_n A_1 b_1$$
$$T_n A_2 b_2$$
$$T_n A_3 b_3$$

2. Proportionate frequency errors in the oscillators are $\epsilon_1$, $\epsilon_2$, and $\epsilon_3$ in the airborne repeaters $A_1$, $A_2$, and $A_3$, respectively, and are $y$ and $z$ in the transponder units $T_{nII}$ and $T_n$, respectively. 3. Frequency errors in the master station are insignificant compared with the other frequency errors.

Based on these assumptions, the expressions for the event times are:

$$t_{30} - t_{13} = b_3$$
$$t_{31} - t_6 = b_1$$
$$t_{32} - t_{11} = b_2$$
$$t_{33} - t_{16} = b_3$$
$$t_{29} = m_a + (u + 3np - 3p)(1 + y)$$
$$t_{34} = m_b + (u + 3np - 3p)(1 + z)$$
$$m_a = (m_1 + a_1) \text{ or } (m_2 + a_2) \text{ or } (m_3 + a_3)$$
$$m_b = (m_1 + b_1) \text{ or } (m_2 + b_2) \text{ or } (m_3 + b_3)$$

Note that, in general, a transponder unit can be synchronized by the cycle-initiate pulse from any airborne transponder since it is possible that it may be shielded by terrain from any two of them.

$$t_{35} - t_{34} = 3p(1+z) \quad 32 = tt_{36} - t_{25} = a_1$$
$$t_{40} - t_{25} = a_2$$
$$t_{44} - t_{25} = a_3$$
$$t_{37} - t_{31} = t_{38} - t_{32} = t_{39} - t_{33} = b_1$$
$$t_{41} - t_{31} = t_{42} - t_{32} = t_{43} - t_{33} = b_2$$
$$t_{45} - t_{31} = t_{46} - t_{32} = t - t_{33} = b_3$$

From a study of FIG. 3, it can be seen that, during the last four pulse periods of a cycle, there are 33 potentially critical margins. These are:

$$q_1 = t_{17} - t_5$$
$$q_2 = t_6 - t_{17}$$
$$q_3 = t_{18} - t_6$$
$$q_4 = t_7 - t_{18}$$
$$q_5 = t_{19} - t_{10}$$
$$q_6 = t_{11} - t_{19}$$
$$q_7 = t_{20} - t_{11}$$
$$q_8 = t_{12} - t_{20}$$
$$q_9 = t_{13} - t_{21}$$
$$q_{10} = t_{22} - t_{13}$$
$$q_{11} = t_{14} - t_{22}$$
$$q_{12} = t_{23} - t_{15}$$
$$q_{13} = t_{16} - t_{23}$$
$$q_{14} = t_{24} - t_{16}$$
$$q_{15} = t_{29} - t_{25}$$
$$q_{16} = t_{26} - t_{29}$$
$$q_{17} = t_{34} - t_{30}$$
$$q_{18} = t_{31} - t_{34}$$
$$q_{19} = t_{35} - t_{33}$$
$$q_{20} = t_{17} - t_{36}$$
$$q_{21} = t_{37} - t_{17}$$
$$q_{22} = t_{18} - t_{37}$$
$$q_{23} = t_{38} - t_{18}$$
$$q_{24} = t_{19} - t_{41}$$
$$q_{25} = t_{42} - t_{19}$$
$$q_{26} = t_{20} - t_{42}$$
$$q_{27} = t_{43} - t_{20}$$
$$q_{28} = t_{44} - t_{21}$$
$$q_{29} = t_{22} - t_{44}$$
$$q_{30} = t_{45} - t_{22}$$
$$q_{31} = t_{23} - t_{46}$$
$$q_{32} = t_{47} - t_{23}$$
$$q_{33} = t_{24} - t_{47}$$

Substituting the expressions for the event times in the above equations of the margins, we find $$q_1 = (h-k+p) + (h+3np-3p)\epsilon_1$$
$$q_2 = (k-h) - (h+3np-3p)\epsilon_1$$
$$q_3 = (h-k+p) + (h+3np-2p)\epsilon_1$$
$$g_4 = (k-h) - (h+3np-2p)\epsilon_1$$
$$q_5 = (h-k+p) + (h+3np-2p)\epsilon_2$$
$$q_6 = (k-h) - (h+3np-2p)\epsilon_2$$

$$q_7 = (h-k+p) + (h+3np-p)\epsilon_2$$
$$q_8 = (k-h) - (h+3np-p)\epsilon_2$$
$$q_9 = (k-h) - (h+3np-4p)\epsilon_3$$

$$q_{10} = (h-k+p) + (h+3np-3p)\epsilon_3$$
$$q_{11} = (k-h) - (h+3np-3p)\epsilon_3$$
$$q_{12} = (h-k+p) + (h+3np-p)\epsilon_3$$

$$q_{13} = (k-h) - (h+3np-p)\epsilon_3$$
$$q_{14} = (h-k+p) + (h+3np)\epsilon_3$$
$$q_{15} = (u-k+p) + (m_a - m_3 - a_3) + (u+3np-3p)y$$

$$q_{16} = (k-u) + (a_1 + m_1 - m_a) - (u+3np-3p)y$$
$$q_{17} = (u-k+p) + (m_b - m_3 - b_3) + (u+3np-3p)z$$
$$q_{18} = (k-u) + (m_1 + b_1 - m_b) - (u+3np-3p)z$$

$$q_{19} = (u-k+p) + (m_b - m_3 - b_3) + (u+3np)z$$
$$q_{20} = (h-k+p) + (m_1 - a_1 - a_3 - m_3) + (h+3np-3p)\epsilon_1$$
$$q_{21} = (k-h) + 2b_1 - (h+3np-3p)\epsilon_1$$

$$q_{22} = (h-k+p) - 2b_1 + (h+3np-2p)\epsilon_1$$
$$q_{23} = (k-h) = b_1 + b_2 + m_2 - m_1) - (h+3np-2p)\epsilon_1$$
$$9_{24} = (h-k+p) + (m_2 - b_1 - b_2 - m_1) + (h+3np-2p)\epsilon_2$$
$$q_{25} = (k-h) + 2b_2 - (h+3np-2p)\epsilon_2$$
$$q_{26} = (h-k+p) - 2b_2 + (h+3np-p)\epsilon_2$$
$$q_{27} = (k-h) + (b_2 + b_3 + m_3 - m_2) - (h+3np-p)\epsilon_2$$

$$q_{28} = (k-h) + 2a_3 - (h+3np-4p)\epsilon_3$$
$$q_{29} = (h-k+p) - 2a_3 + (h+3np-3p)\epsilon_3$$
$$q_{30} = (k-h) + (b_1 + b_3 + m_1 - m_3) - (h+3np-3p)\epsilon_3$$

$$q_{31} = (h-k+p) + (m_3 - m_2 - b_2 - b_3) + (h+3np-p)\epsilon_3$$
$$q_{32} = (k-h) + 2b_3 + (h+3np-p)\epsilon_3$$
$$q_{33} = (h-k+p) - 2b_3 + (h+3np)\epsilon_3$$

Now let the greatest possible one-way transit time for any link be $D$. $D$ is then dependent upon the dimensions of the system coverage space. Thus, $$0 < m_1, m_2, m_3, a_1, a_2, a_3, b_1, b_2, b_3 \leq D \text{ and}$$
$$0 - m_a, m_b \leq 2D.$$

The expression for each margin consists of a "nominal" part, a function of $h$, $k$, $u$, $p$, and the transit times, and a "frequency error" part, a function of $h$, $u$, $p$, $n$ and the proportionate frequency errors.

The constants $h$, $k$ and $u$ are chosen so that the minimum nominal margin is maximized. Then the other parts of the expressions determine the specification on frequency error. The minimum nominal margin is the smallest of $$k - k + p - 3D$$
$$k - h - D$$
$$u - k + p - 2D$$
$$k - u - D$$

It can be shown that the minimum is maximized if $$h - k = D - P/2$$

and $$k - \frac{P}{2} \leq u \leq k - \frac{P}{2} + D$$

Under these conditions, the minimum margin is
$$p-4D/2$$
To simplify the digital circuitry in the airborne repeaters and in the transponder units, we select $h$ and $u$ to be zero, which results in
$$k = P/2 - D$$
For large values of $n$, the "frequency error" component of the margin is approximately
$$\pm 3np\epsilon_1, \text{ etc.}$$
Hence, the specification for stability of the oscillators in the airborne repeaters and in the transponder units is that $$\left(\frac{P}{2} - 2D\right) - 3np|\epsilon| > 0$$

or $$\epsilon_{max} = \frac{p-4D}{6np}$$

where $|\epsilon|_{max}$ is the maximum allowable proportionate frequency error.

Hence, there is a tradeoff between maximum allowable frequency error ($|\epsilon|_{max}$), system capacity ($n$) and data rate ($1/np$).

Note that there is also an absolute limit to the capacity, or $$n_{max} = \frac{1}{6|\epsilon|_{max}}$$

For example, if the maximum allowable proportionate frequency error of the oscillators is $10^{14}$, the system capacity is 1,000 targets, and the maximum link range is 100 miles (D=0.538 msecs.), then the duration of a cycle is approximately 5.4 seconds.

In summary, the above calculations show that:
1. The master station transmits its first ranging pulse at ($p/2-$) after the CIP ($p$ is the ranging pulse repetition interval and D is the maximum possible one-way transit time for any radio link).
2. The airborne repeater $A_1$ enables its transmitters, for the first time, immediately after it has been synchronized.
3. The airborne repeater $A_2$ enables its transmitters, for the first time, at $p$ after it has been synchronized.
4. The airborne repeater $A_3$ enables its transmitters, for the first time, at $2p$ after it has been synchronized.
5. All airborne repeaters are enabled for $p$ and then inhibited for $2p$, continuing this sequence until the next cycle initiating pulse is detected.
6. The ground repeater or transponder unit $T_i$ enables its transmitter at $3(i-1)p$ after it has been synchronized and stays enabled for $3p$. It is enabled only once in each cycle.

As is seen from the above, all mark and space times are simple functions of $p$. This not only simplifies the design of the digital counting circuitry but also allows the phasing of the sequencing to be changed easily by an operator adjustment.

MASTER STATION

Figure 4:
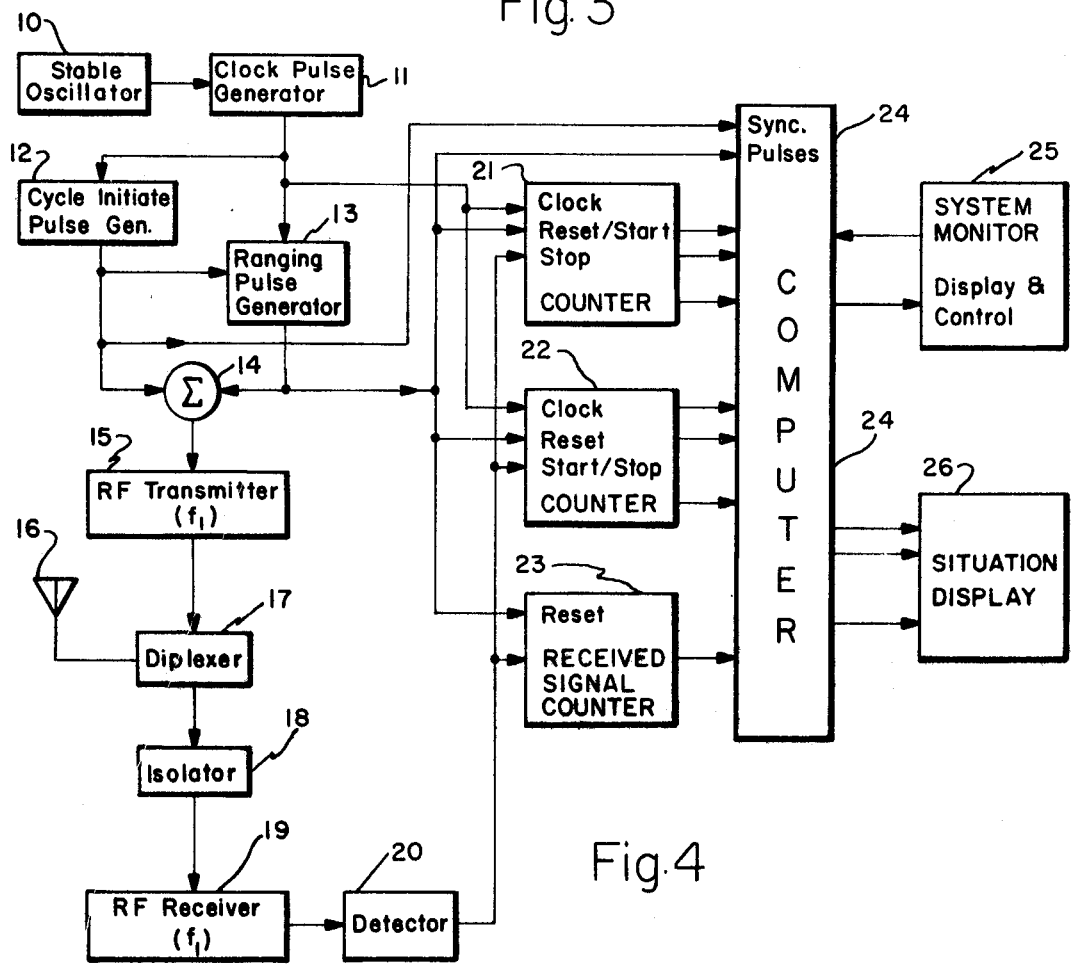
FIG. 4 is a more detailed block diagram of a typical master station portion of the system of FIG. 1.

A block schematic of the master station is shown in FIG. 4. A stable oscillator 10, having accuracy of $1:10^6$ is used at the master station since the measuring function is performed there. This oscillator drives a clock pulse generator 11.

Clock pulses are fed to cycle initiate pulse generator 12 which generates pulses of width $10\tau$ once every cycle.

Clock pulses are also fed to ranging pulse generator 13 which generates pulses of width $\tau$ and with a pulse repetition index of $p$. The first ranging pulse in each cycle occurs at time ($p/2-da0$) after the cycle initiate pulse.

The two types of pulses are added together by summer 14 and are modulated on an RF carrier at frequency $f_1$ by radio frequency transmitter 15.

Sharing common antenna 16 with transmitter 15 is radio frequency receiver 19, also at frequency $f_1$. Antenna sharing is made possible by diplexer 17 and isolator 18. The received pulses are detected by video detector 20. In normal operation two pulses will be detected during each pulse period. These pulses are fed to counters 21 and 22.

Counter 21 measures the time interval between the transmission of a ranging pulse and the receipt of the first transponded pulse. Accordingly, counter 21 is started by a ranging pulse and stopped by the output from the video detector 20.

Counter 22 measures the time difference between the receipt of both transponded pulses. It is both started and stopped by the output from video detector 20.

Both counters are fed with the accurate clock pulses from clock pulse generator 11 and are reset by the ranging pulses. They are connected to computer 24 through parallel output wires.

In order to monitor system performance and especially to detect spoofing action, it is necessary to check, during each pulse period, that only two transponded pulse are being received. To do this, the output of video detector 20 is fed to received signal counter 23, which informs computer 24 if more than two pulses are received. Counter 23 is also reset by the ranging pulses.

Computer 24 requires pulses for synchronized operation and also for target identification. These are provided by cycle initiate pulse generator 12 and ranging pulse generator 13.

The computer feeds situation display 26 through parallel output wires. It is connected with system monitor 25 which has the control function for the entire system.

AIRBORNE REPEATER UNIT

The block schematic of a typical airborne repeater $A_n$ is shown in FIG. 5. A single antenna, 27, is shared, through a diplexer 28, isolator 29 and hybrid network 30, by two radio frequency receivers 31 and 32 receiving at frequencies $f_1$ and $f_2$ respectively; and by two radio frequency transmitters 33 and 34 transmitting at $f_1$ and $f_2$ respectively via hybrid network 35.

The outputs from receivers 31 and 32 are fed through gates 36 and 37, respectively, to transmitters 33 and 34. When the airborne repeater is in the transmitter-enabled mode, gates 36 and 37 are opened so that the airborne repeater operates as a conventional transponder.

A signal received at frequency $f_1$ will be transponded at both frequencies $f_1$ and $f_2$. A signal received at frequency $f_2$ will be transponded at frequency $f_1$.

Most of the other circuitry in the airborne repeater is digital and is required for transmitter enable/inhibit synchronization.

An oscillator 45, of accuracy about $1:10^4$, drives a clock pulse generator, 44, which generates pulses at a pulse repetition frequency of $1/p$ via pulse shaper 46 and gate 47. Except at the beginning of a cycle, these pulses are fed to two-speed counter 41 which counts up in regular clock time and then counts down in half-clock time, and then up again, etc. As counter 41 counts up, transmitters 33 and 34 are enabled; as counter 41 counts down, transmitters 33 and 34 are inhibited.

The radio frequency output from receiver 31 is video detected by detector 38 and the detected video pulses are sent to trailing edge pulse generator 39 and pulse width discriminator 48. The trailing edge pulse generator generates a pulse which coincides with the trailing edge of each received pulse. The pulse width discriminator provides an output if and when a received pulse exceeds $3\tau$ in duration. The trailing edge pulse is passed through AND gate 40 only when pulse width discriminator 48 generates an output. This happens only when a cycle initiate pulse is sent by the master station at the beginning of each cycle.

When a received pulse width exceeds $3\tau$, pulse width discriminator 48 generates an output which resets counters 41 and 42, and inhibits gate 47 to prevent oscillator pulses from entering clock pulse generator 45. The pulse exceeding $3\tau$ also enables transmitters 33 and 34 if they are not already enabled, so that the cycle initiate pulse may be transponded to transponder units $T_n$.

When the trailing edge is detected by trailing edge pulse generator 39 the transponders are inhibited and the clock pulses are allowed to run to counters 41 and 42 again.

The clock pulses are first fed to an adjustable counter 42 which will count up to 0, 1, or 2, depending upon an operator preset. When this counter is full, it opens gate 43 and allows the clock pulses to pass to two-speed counter 41.

The setting of adjustable counter 42 identifies the airborne repeater unit as $A_1$, $A_2$, or $A_3$.

TRANSPONDER UNIT (OR GROUND REPEATER)

There is no difference between a transponder unit or a ground repeater except in the operator setting of the identification phasing. The block schematic of this unit is shown in FIG. 6.

A common antenna 49 is shared, through a diplexer 51 by radio frequency receiver 52, via isolator 50, operating at $f_2$ and radio frequency transmitter 53, also operating at frequency $f_2$. When the unit is in the transmitter-enable mode, radio frequency signals from receiver 52 are fed directly through to transmitter 53.

An oscillator, 63, having accuracy of about $1:10^4$ drives, via pulse shaper 64 and gate 62, clock pulse generator 61, which generates clock pulses at a PRF of $1/3p$. After the cycle initiate pulse has been received, gate 62 enables the clock pulses to pass to adjustable counter 60 which counts up to $(n-1)$. The value of $n$ is an operator preset and is the identification designation of the target.

It should be noted that the identification numbers 1 and 2 are always reserved for the ground repeaters.

When adjustable counter 60 has reached its full count, it passes the clock pulses to single stage counter 59. The first pulse through adjustable counter 60 will set the unit in the transmitter-enable mode and the first pulse through single stage counter 59, which occurs at time $2p$ later, will return the unit to the transmitter-inhibit mode.

At the same time that the unit reverts to the transmitter-inhibit mode, the oscillator pulses are inhibited, by gate 62, from entering the clock pulse generator, and all counters are reset to zero.

The system is synchronized at the beginning of each cycle in the following manner. The radio frequency pulses from receiver 52 are video detected by detector 54 and the video pulses fed to trailing edge pulse generator 57 and pulse width discriminator 55. The output from trailing edge pulse generator 47 is passed through gate 58 only when pulse width discriminator 55 detects an incoming pulse width greater than $3\tau$. When this happens, the output from trailing edge pulse generator 57 opens gate 62 and the clock pulses are permitted to enter counters 59 and 60.

As a safety feature, an output from pulse width discriminator 55 also inhibits transmitter 53 via gate 56, inhibits the oscillator pulses via gate 62 and resets the counters although in normal operation this will already have been done by the output pulse from single stage counter 59.

All radio frequency circuitry in a transponder unit is tuned to frequency $f_2$; however, this is broadband tuning and, hence does not require calibration at frequent intervals.

TWO AIRBORNE REPEATER MODE OF OPERATION

A very important alternate mode of operation requires the use of only two airborne repeaters instead of three and the availability of target altitude data from other systems.

The positions of the targets are then computed from the altitudes and the two target-airborn repeater slant ranges. The positions of the airborne repeaters are still found in the normal manner.

This mode of operation can be used only over comparatively flat terrain which has been surveyed, and even then it has less accuracy than the normal mode. Further, the target position data are no longer unambiguous. Two positions for each target are computed in each cycle, and the ambiguities have to be resolved by serial comparison of the results.

Despite the disadvantages of this mode of operation, it does offer an alternative to catastrophic system degradation upon the loss of one airborne repeater.

ALTERNATE GROUND REPEATER MODE

The only difference between a ground repeater and a target transponder unit is that the former is located at a known location and has been designated either number 1 or 2. Thus, if, during an operation, one of the ground repeaters becomes unserviceable, it could be rapidly replaced by any ground target transponder in a suitable location, specifically one that is not colinear with the other ground transponder and the master station. All that is necessary is to command, via the communications link, that the chosen target remain where he is and change the designation preset on his unit to 1 or 2, and to provide the computer with the new ground repeater position data.

REASSIGNMENT OF IDENTIFICATION NUMBER

If one of the target transponder units is falling badly out of synchronization, a fact easily discernible by the system status monitor, a likely cause is that it oscillator frequency drift is greater than the specified maximum allowable. However, the effect of this fault increases as the identification number of the unit increases. Hence, a temporary alleviation of the problem might be achieved by reassigning a lower identification number to the faulty unit. For this purpose, a block of low numbers should be reserved

FREQUENCY HOPPING

If the enemy is attempting to jam the system, he will probably radiate at frequency $f_2$ and hence jam the $f_2$ receivers in the airborne repeaters. He may not know of the existence of the $f_1$ transmissions but cannot help hearing $f_2$ transmissions, Further, because of line-of-sight propagation, his jamming at frequency $f_2$ may not even affect the receivers carried by ground or low altitude targets.

In this situation, some relief from jamming may be obtained by hopping the $f_2$ frequency in a random, pulse-to-pulse manner. The $f_2$ receivers in the airborne repeaters would have to be narrow-banded and frequency-hopped synchronously with their transmitters. The transponder units would have sufficiently broad bandwidths to handle all the frequencies in the $f_2$ band.

Then, even if the enemy synchronously frequency hopped his jamming signals, he would not be able to prevent system operation with targets which are closer to the airborne repeaters than he is.

What is claimed is:

1. An apparatus for tracking each of a plurality of cooperative targets comprising:
   a master station,
      said master station generating a series of signals at a first frequency;
   an airborne repeater,
      said airborne repeater receiving the series of pulses generated by the master station and transmitting the series of pulses at the first frequency and at a second frequency;
   means at said master station for receiving the pulses transmitted by the airborne repeater at the first frequency;
   at least one cooperative target, said cooperative target receiving the pulses transmitted by the airborne repeater at the second frequency and transmitting the received pulses back to the airborne repeater at the second frequency;
   means for said airborne repeater retransmitting at the first frequency the pulses received from the cooperative target at the second frequency;
   means for said master station later receiving the pulses retransmitted by the airborne repeater at the first frequency;
   means for said master station measuring the time difference between the transmitted pulses and the pulses first received from the airborne repeater to determine the slant range of the airborne repeater with respect to the master station; and
   means for said master station measuring the time difference between the first received and the later received pulses from the airborne repeater to determine the slant range of the cooperative target with respect to the airborne repeater.

2. The apparatus as claimed in claim 1 wherein there are three airborne repeaters.

3. The apparatus as claimed in claim 1 wherein there are two cooperative targets of known position and a plurality of cooperative targets of unknown position.

4. The apparatus as claimed in claim 1 and further including:
means for sequentially enabling each cooperative target to receive the pulses transmitted by each airborne repeater at the second frequency and transmit the received pulses back to each airborne repeater at the second frequency;
means for determining the slant range of each cooperative target with respect to the master station in response to said sequential enabling of each cooperative target; and
means for determining the location of each cooperative target in response to the knowledge of the slant range of each cooperative target.

5. The apparatus as claimed in claim 1 wherein the master station comprises:
a first oscillator;
a first clock pulse generator driven by said first oscillator;
a ranging pulse generator driven by the first clock pulse generator and generating a series of pulses having a constant width and a preselected repetition index;
a cycle initiate pulse generator driven by the first clock pulse generator and generating a series of pulses, one each sequence at the beginning of each sequence, and having a width substantially wider than the pulses generated by the ranging pulse generator;
means for summing the outputs of the ranging pulse generator and the cycle initiate pulse generator;
means for modulating said summed pulses with a first radio frequency;
means for transmitting said modulated pulses including a first diplexer and a first antenna;
means for receiving said modulated pulses including said first diplexer and said first antenna;
a first detector for video detecting the received pulses;
a first counter receiving pulses from the first clock pulse generator, the ranging pulse generator and the first detector, said first counter started by an output from the ranging pulse generator and stopped by an output from the first detector;
a second counter receiving pulses from the first clock pulse generator, ranging pulse generator and the first detector, said second counter started and stopped by pulses received from the first detector; so that the elapsed time between receipt of the first pulse from the airborne receiver and the second pulse from the airborne receiver can be determined, and therefore the slant range of each ground repeater can be determined.

6. The apparatus as claimed in claim 1 wherein an airborne repeater comprises:
a second oscillator;
a second clock pulse generator driven by the second oscillator and controlled by a first gate;
a two-speed counter, said counter counting up in regular clock time and counting down in half clock time;
a second transmitter transmitting at the first frequency via a second diplexer and a second antenna;
a third transmitter transmitting at the second frequency via said second diplexer and said second antenna;
a second receiver receiving at the first frequency via said second antenna and said second diplexer;
a third receiver receiving at the second frequency via said second antenna and said second diplexer;
means for connecting the outputs of the second and third receivers to the inputs of the second and third transmitters to retransmit a signal received at the first frequency at both the first and second frequencies;
means for connecting the output of the third receiver to the input of the second transmitter to transmit a signal received at the second frequency at the first frequency;
means for inhibiting the second and third transmitters as the two-speed counter is counting down and enabling the second and third transmitters as the two-speed counter is counting up;
a second detector for video detecting the output of the second receiver;
a first trailing edge pulse generator driven by the second detector for generating a pulse coincident with the trailing edge of each received pulse;
a first pulse width discriminator for generating an output if and when a pulse is received from said cycle initiate pulse generator;
a first adjustable counter, said counter counting to a predetermined number and stopping;
second gate means for connecting the output of said first adjustable counter to an input of the two-speed counter, said gate opening when the first adjustable counter has reached full count,
means for resetting the two-speed counter and the first adjustable counter in response to an output from the first pulse width discriminator;
means for inhibiting oscillator pulses from entering the second clock pulse generator in response to an output from the first pulse width discriminator;
means for inhibiting the ground repeater units in response to an output from the first trailing edge pulse generator; and
means for enabling the two-speed counter and the first adjustable counter in response to an output from the first trailing edge pulse generator.

7. The apparatus as claimed in claim 1 wherein a ground repeater comprises:
a fourth transmitter transmitting at the second frequency via a third diplexer and a third antenna;
a fourth receiver receiving at the second frequency via the third antenna and the third diplexer;
a third oscillator;
a third clock pulse generator driven by said third oscillator;
a second adjustable counter, said counter counting up to a predetermined number;
means for gating the output of the third clock pulse generator to said second adjustable counter in response to an output from the cycle initiate pulse generator;
a single stage counter responsive to the second adjustable counter;
means for gating the output of the second adjustable counter to the single stage counter when the second adjustable counter reaches full count;
means for gating the output of the fourth receiver to the input to the fourth transmitter in response to the first pulse to pass through the second adjustable counter;
means for inhibiting the output of the fourth receiver to the input of the fourth transmitter in response to the first pulse to pass through the single stage counter;
means for resetting to zero the single stage counter and the second adjustable counter in response to the first pulse to pass through the single stage counter;
a third detector means for video detecting the output of the fourth receiver;
a second trailing edge pulse generator responsive to the third detector for producing an output coincident with the trailing edge of each received pulse;
a second pulse width discriminator for generating an output if and when a pulse is received from said cycle initiate pulse generator;
means for gating the output of the third oscillator to the third clock pulse generator and the output from the third clock pulse generator to the single stage counter and the second adjustable counter in response to the second trailing edge pulse generator only when the second pulse width discriminator produces an output; and
means for inhibiting the fourth transmitter in response to an output from the second pulse width discriminator.